DUAL FEEDBACK CIRCUIT FOR STEREOPHONIC AUDIO-FREQUENCY SIGNAL AMPLIFIER SYSTEMS

Filed April 30, 1958 2 Sheets-Sheet 1

INVENTORS
ROY S. FINE &
SYDNEY V. PERRY
BY
H. L. Newton
ATTORNEY

March 20, 1962 R. S. FINE ET AL 3,026,373

DUAL FEEDBACK CIRCUIT FOR STEREOPHONIC AUDIO-FREQUENCY SIGNAL AMPLIFIER SYSTEMS

Filed April 30, 1958 2 Sheets-Sheet 2

INVENTORS
ROY S. FINE &
SYDNEY V. PERRY
BY
H. C. Newton
ATTORNEY

United States Patent Office 3,026,373
Patented Mar. 20, 1962

3,026,373

DUAL FEEDBACK CIRCUIT FOR STEREOPHONIC AUDIO-FREQUENCY SIGNAL AMPLIFIER SYSTEMS

Roy S. Fine and Sydney V. Perry, Haddonfield, N.J., assignors to Radio Corporation of America, a corporation of Delaware Filed Apr. 30, 1958, Ser. No. 735,347
4 Claims. (Cl. 179—1)

Figure 1A:
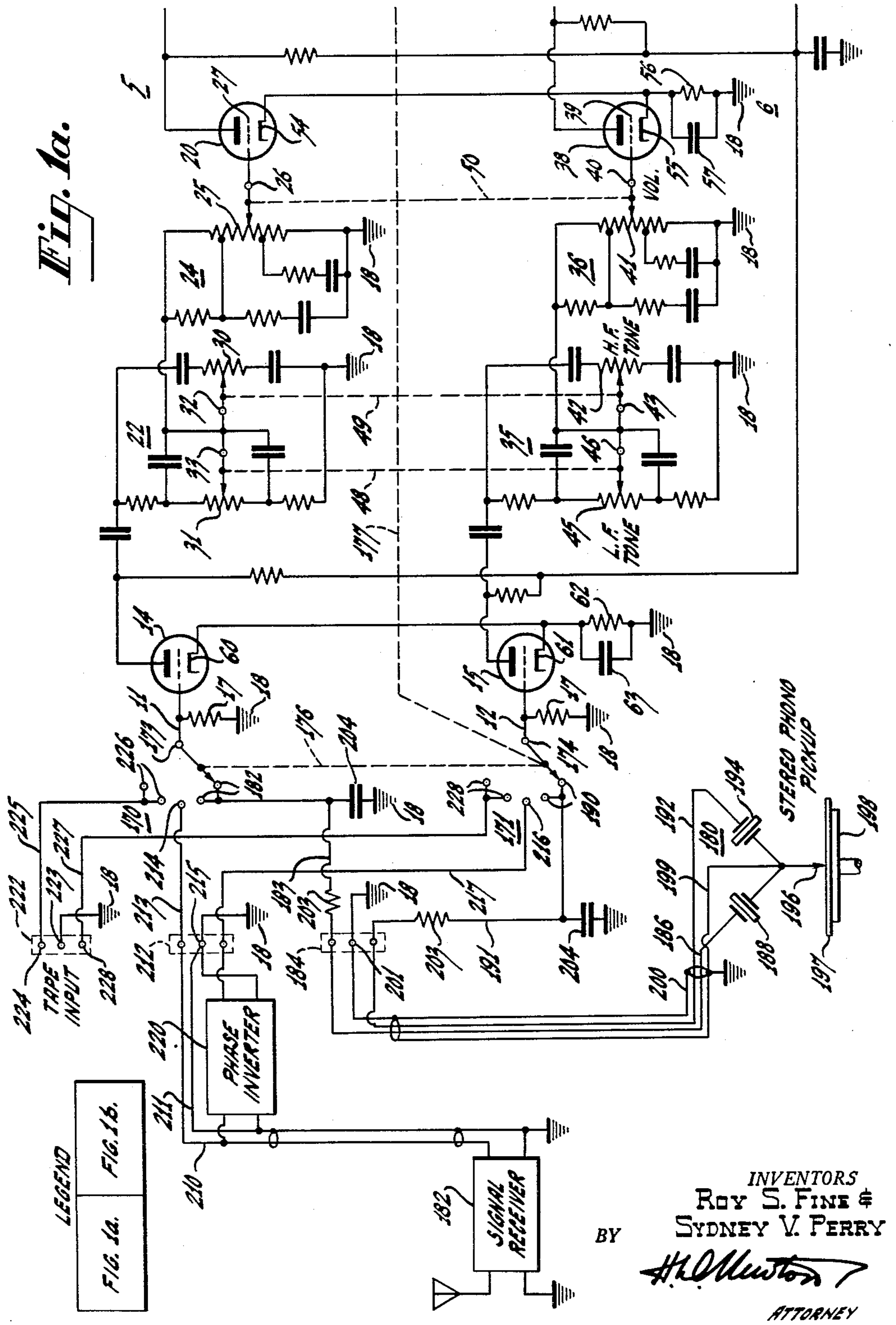

The present invention relates to audio-frequency signal amplifier systems of the type having two separate, substantially duplicate, amplifier channels and separate speaker output means for each channel, for stereophonic sound reproduction in radio, television, tape and phonograph-record playing equipments. For present most effective use in this field, it is considered that such equipments must be fully compatible, that is, provide both the standard monaural or single-channel and the new stereophonic or dual-channel sound reproduction. Thus, the audio-frequency amplifier and speaker means provided for such equipments and primarily adapted for amplifying and reproducing dual-channel stereophonic sound signals, should also be adapted for amplifying and reproducing monaural sound signals with equal facility and effectiveness.

The present invention relates more particularly to an improved dual-channel audio frequency signal amplifier system of this type which is adapted for efficient stereophonic and monaural sound signal amplification as shown, described and claimed in our copending application for "Stereophonic Audio-Frequency Signal Amplifier Systems," Ser. No. 732,031, filed concurrently herewith, and assigned to the same assignee. In that amplifier system two separate signal amplifier channels are provided, each with separate speaker output means for stereophonic signal amplification and reproduction. The two channels normally thus operate independently and each carries half the total power which is transmitted through the system. For simplicity and low cost for stereophonic signal reproduction, two substantially identical class-A single-ended amplifiers, transformer-coupled to their respective speaker means, are provided.

In the amplifier system referred to, furthermore, the two separate stereophonic amplifiers or signal channels may be connected for push-pull or out-of-phase signal amplification through the same channels from a monaural signal source, with the input circuits in parallel and signal phase inversion means interposed between the source and one channel. When the signal source is stereophonic but used monaurally, such as a stereophonic phonograph pickup designed for the reproduction of sound from two-channel stereophonic phonograph records two signals of equal amplitude but opposite in phase are provided when such pickup is used for reproducing sounds from ordinary monaural lateral-cut records. This type of signal is also represented by the lateral signal components of sound from a stereophonic phonograph record. Such "push-pull" monaural signals may be applied directly to the input ends of the two amplifier channels in parallel without phase inversion preceding either channel.

Signal phase inversion is provided in one channel in any case at the output end following the last amplifier stage and preceding the speaker means. With transformer coupling in the output circuit, this involves reversing the connections to the primary or the secondary windings for that channel. Inversion at the primary winding is preferred, in accordance with the invention, as it simplifies and facilitates making connections with the secondary winding terminals with the right polarities for proper speaker phasing and feedback.

Phase inversion at the primary winding of the one output transformer further permits the secondary windings to be connected in parallel for in-phase operation without change in the remaining portions of the amplifier channels and without disturbing feedback circuit means or the impedance matching with the respective speakers. Since the two amplifier channels operate in push-pull or out-of-phase relation for monaural signal amplification, and one channel is phase-inverted at the output end, the same action is provided for the reduction of even-order harmonics as in a conventional push-pull amplifier, yet each channel is provided by a relatively low cost single-ended amplifier circuit.

To reduce distortion and to improve the frequency response of audio-frequency amplifiers, it is desirable, as is well known, to introduce negative or inverse feedback over a number of amplifier stages. Accordingly, it is a primary object of this invention to provide an improved dual-channel feedback amplifier, having a dual circuit for introducing negative feedback into the two separate amplier channels, that operates for both stereophonic and monaural signal reproduction as referred to, thereby to gain the advantages of negative feedback for monaural sound reproduction with both channels in push-pull or out-of-phase relation, as well as for stereophonic sound reproduction with both channels operating independently.

It is a further object of this invention, to provide an improved feedback circuit for a stereophonic dual-channel amplifier system that operates without circuit change for push-pull or out-of-phase monaural signal amplification in dual channels.

It is also an object of the present invention, to provide an improved dual-channel audio-frequency amplifier system for stereophonic signals which is adapted for efficient monaural amplification with full power operation of and effective inverse feedback in both channels at all times.

It is also a further object of the present invention, to provide an improved dual-feedback audio-frequency signal amplifier system having two separate single-ended amplifying channels for stereophonic sound reproduction, which is adapted for monaural signal reproduction through both channels in push-pull or out-of-phase relation with effective hum reduction and reduction of overall distortion.

For monaural signal reproduction, as hereinbefore referred to, the two signal channels of the amplifier system operate in push-pull or out-of-phase relation, but with the speaker output circuits or output transformer secondary windings connected in parallel and in in-phase relation. Thus negative feedback must be provided from effectively a common output circuit and applied to out-of-phase amplifier channels. This requires different feedback circuits to the two channels for monaural operation that also can be effective during normal stereophonic operation without circuit change.

The feedback circuit must, therefore, be independent of the mode of operation of the two channels, that is, the feedback voltages must remain in the correct phase for stereophonic or separate channel operation of the amplifier. The problem is to introduce negative feedback into the two separate amplifier channels from the parallel connected secondary windings which constitute effectively a single feedback voltage source during monaural signal amplification. The feedback voltage from the output windings is out-of-phase with the grid of the driver stage amplifier in one channel, for example, and may be applied thereto for negative feedback. However, the same voltage is in-phase with the corresponding grid in the other amplifier channel and therefore cannot be applied in the same manner in both channels. If this voltage is applied to the cathode of the corresponding stage in the other channel where in-phase voltage is required for negative feedback, this feedback circuit permits the output transformers to be connected in parallel and in phase on the secondary side thereof for monaural signal reproduction while effecting push-pull or out-of-phase operation of the amplifier channels.

This type of operation could not be attained if the feedback circuits were identical as for stereophonic reproduction alone. To provide the same type of feedback in both channels for both stereophonic and monaural operation otherwise would require another amplifier stage to be inserted in one channel to give the necessary phase inversion in the amplifier channel. Reversal of one output transformer with respect to the other would not be required in that case. However, this would complicate the amplifier, increase the cost, and the gain of the phase-inversion stage would have to be reduced to unity and therefore lost.

In a dual-channel audio-frequency signal amplifier embodying the invention, the dual feedback circuits may be provided with fixed connections between different feedback injection points and the respective normally independent secondary or output circuits. The change from stereophonic to monaural operation may be effected by simple switching means for opening and closing a single connection between the two secondary circuits without affecting the feedback circuits or their operation. The output or secondary circuits may thus operate independently with their respective speakers and feedback circuits, or in parallel for dual feedback from effectively a common secondary or output circuit, and wholly without change in the feedback circuits per se. It may be pointed out that when the secondary circuits are in parallel, a single speaker may be provided for the monaural operation of the system, also without affecting the feedback circuit operation.

For stereophonic signal amplifications, the amplifier channels are single-ended and therefore there is no cancellation of the ripple voltage present in the plate supply circuit as would be the case with a push-pull transformer which provides such cancellation in the two halves of the primary winding. The ripple voltage would appear as hum in the output circuits, which can be reduced by providing increased power supply filtering. However, if a resistor-capacitor filter is used, greater voltage drop and heat dissipation is encountered. If a series choke coil filter is used, the cost is appreciably increased. By introducing in both channels the type of feedback described, additional filtering is not necessary. Hum is reduced by the amount of the negative feedback in the system since any signal injected or generated in the feedback loop is degenerated.

The invention will further be understood from the following description when considered in connection with the accompanying drawing, and its scope is pointed out in the appended claims.

Figure 1B:
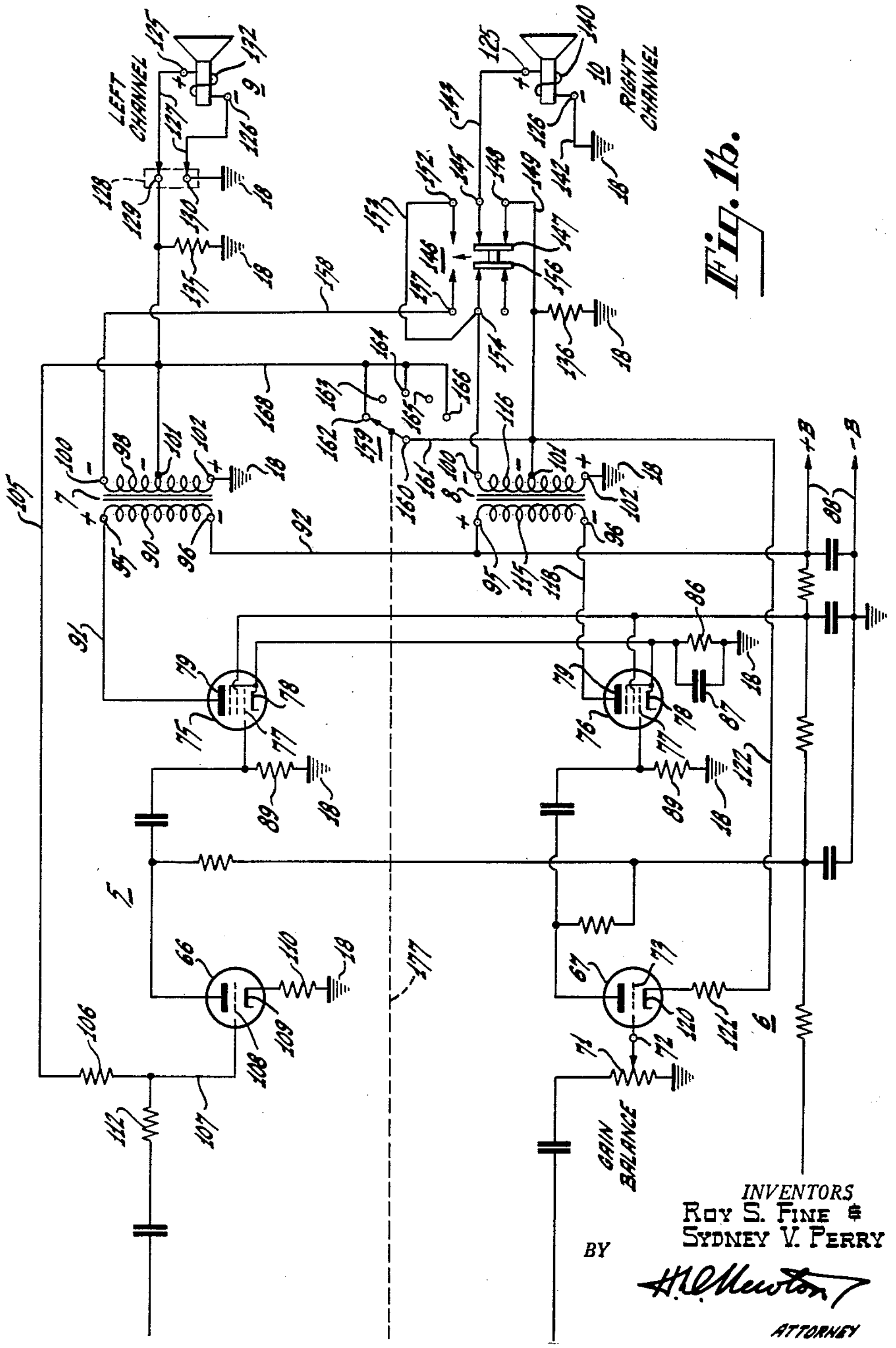

In the drawings, the single figure, comprising FIGURES 1*a* and 1*b*, is a schematic circuit diagram of a dual-channel audio-frequency signal amplifier system embodying the invention.

Referring to the drawing, the dual-channel amplifier system comprises two separate, like or substantially duplicate, amplifiers or amplifier channels 5 and 6, of the multistage, single-ended type, coupled at the output ends, through suitable single-ended output transformers 7 and 8 respectively, to their respective loud speakers or loud speaker systems represented by speakers 9 and 10. The amplifiers may be either of the transistor or of the electronic-tube type. In the present example, the amplifiers are of the electronic-tube, resistance-coupled type, as provided in a present commercial embodiment of the invention.

Signals are applied to each amplifier through separate input circuits 11 and 12 which are connected to the input grids of first stage amplifier tubes 14 and 15, respectively, across suitable input grid resistors 17 in each grid circuit. Each resistor is connected to ground or chassis 18 for the amplifier system, which provides a point of common reference potential for the various circuits, and the low potential terminal of each of the input circuits 11 and 12. In the amplifier channel 5 the first stage amplifier tube 14 is coupled to a second stage amplifier tube 20 through a suitable tone control network 22, and a volume control network 24 serially, the latter having a volume control potentiometer 25, the movable contact 26 of which is connected to the input grid 27 of the tube 20. In the tone control network, a high frequency tone control potentiometer 30 and a low frequency tone control potentiometer 31 are provided with similar movable contacts 32 and 33, respectively, for tone control adjustment. It will be noted that both the tone control network and the volume control network are connected to ground 18 for the system.

In a similar manner, the amplifier channel 6 is provided with a tone control network 35 and a volume control network 36 interposed serially in circuit between the input stage amplifier tube 15 and a second stage amplifier tube 38, the signal input grid 39 of which is connected with the volume control contact 40 of the volume control potentiometer 41. In the tone control network, there are likewise provided a high frequency tone control potentiometer 42 having a movable tone control contact 43, and a low frequency tone control potentiometer 45 having a movable tone control contact 46. Both the tone control and volume control networks are connected to chassis or ground 18 as indicated.

It will be noted that the low frequency tone control contacts 33 and 46 are connected, as indicated by the dotted line 48, for unitary or joint operation and simultaneous control of the low frequency tone in both channels. Likewise, the high frequency tone control contacts 32 and 43 are connected, as indicated by the dotted line 49, for unitary or joint operation and simultaneous control of the high frequency tone in both channels, whereby a single low frequency and a single high frequency tone control knob (not shown) may be used for the dual-channel amplifier system. Since the sound volume in a stereophonic amplifier must likewise be adjusted in both channels simultaneously, the volume control potentiometer contacts 26 and 40 are similarly connected for unitary operation, as indicated by the dotted line 50.

It will also be noted that the cathodes 54 and 55 of the second stage amplifier tubes 20 and 38, respectively, are connected to chassis ground 18 through a common cathode resistor 56 provided with a bypass capacitor 57, thereby completing the grid-cathode or signal input circuits to each of the amplifier tubes 20 and 38. In a similar manner the cathodes 60 and 61 of the first stage amplifier tubes 14 and 15 are connected to ground 18 through a common cathode resistor 62 having a shunt bypass capacitor 63, whereby the input grid circuits 11 and 12 with common ground 18 are connected between grid and cathode of their respective input stages.

The second stage amplifier tubes 20 and 38 are resistance-coupled to a pair of driver stage tubes 66 and 67, respectively, as shown. The resistance coupling circuit for the tube 67 includes a gain balance potentiometer 71 having a movable contact 72 connected with the input grid 73 for adjusting the gain in the amplifier channel 6 with respect to the gain in the amplifier channel 5, whereby the volume or sound output from both channels may be equalized for all adjustments of the unitary volume control provided for both channels, as hereinbefore described. It will be noted that the potentiometer 71 is connected in shunt relation to the signal channel and to chassis ground at the low potential end.

The driver amplifier tubes 66 and 67 are resistance-coupled to single-ended output amplifier tubes 75 and 76 respectively, each having a signal input grid 77, a cathode 78 and an output anode 79. These may be of any suitable type and are here shown as pentodes. The signal input grids are provided with shunt grid resistors 89 connected to ground 18. As in the preceding amplifier stages, the cathodes are connected to chassis ground 18 through a common cathode resistor 86 shunted by a signal bypass capacitor 87. This common cathode circuit for the various stages is possible since both amplifier channels are in operation simultaneously either for stereophonic or monaural signal amplification. For this reason also, a common anode and grid potential supply circuit, indicated by the positive and negative supply leads 88, may be utilized for both amplifier channels.

In the amplifier channel 5 the single-ended output stage represented by the amplifier tube 75, is coupled to the loud speaker means 9 for that channel through the output coupling transformer 7. This transformer has a primary winding 90 connected in the output anode circuit 91 between the anode 79 and a positive anode supply lead 92 connected with the supply lead 87. The anode circuit 91 is connected to a primary terminal 95 while the other primary terminal 96 is connected with the supply lead 92, whereby the primary winding is connected with a certain polarity relation to the secondary winding indicated at 98, and the secondary terminals 100, 101 and 102, the last being connected to common ground 18 as indicated, and being the low potential terminal of the secondary winding. The terminal 101 on the secondary winding is an intermediate tap and is connected through a voltage feedback lead 105 and a series grid resistor 106 to the grid circuit 107 and the input grid 108 of the driver stage amplifier tube 66. The cathode 109 of the driver stage is connected through a cathode bias resistor 110 to ground 18, whereby the grid-cathode circuit of the driver stage in the channel 5 is completed through the feedback circuit 105 and the portion of the secondary winding 98 between the tap 101 and the ground or low potential terminal 102. In this way voltage feedback in channel 5 is provided by grid injection at the driver stage amplifier tube 66. To isolate the grid 108 from the preceding stage, for the injection of feedback voltage, a series isolating resistor 112 is connected, as indicated, between the grid circuit 107 and the coupling connection with the preceding second stage amplifier tube 20.

The output transformer 8 for amplifier channel 6 is electrically a duplicate of the output transformer 7 and includes a primary winding 115 having like terminals 95 and 96 as the transformer 7, and similarly poled with respect to the corresponding terminals 100, 101 and 102 of its secondary winding 116. It will be noted that the low potential terminal 102 of the secondary winding 116 is connected to common ground 18 like the secondary winding 98, while the primary winding 115 is reversed in polarity in its connection with the anode 79 of the single-ended driver stage tube 75 through its anode output circuit 118 and the positive anode supply lead 92.

The cathode 120 of the driver stage tube 67 for the amplifier channel 6 is connected through self-bias resistor 121 and a feedback circuit 122 to the intermediate tap 101 on the output transformer secondary winding 116, whereby the grid-cathode circuit of the driver tube 67 is connected through the portion of the secondary winding 116 between the intermediate tap 101 and the ground terminal 102, thereby providing inverse feedback on the cathode of the driver stage tube 67 corresponding to the inverse feedback on the grid of the corresponding driver tube 66 of the amplifier channel 5.

For stereophonic signal amplification, the two single-ended amplifiers or amplifier channels 5 and 6 operate as independent amplifiers to apply amplified signals to their respective loud speaker means 9 and 10 in response to stereophonic signals applied simultaneously to the two signal input circuits 11—18 and 12—18. For this mode of operation both speaker means are used independently.

The negative feedback circuit is effective for both stereophonic and monaural signal amplification. The method of introducing negative feedback into the two separate channels, from the interconnected secondary windings of the output transformers which constitute, during monaural signal amplification, effectively a single feedback voltage source, provides out-of-phase grid or input electrode injection of feedback voltage in one channel and in-phase cathode or common electrode injection of feedback voltage in the other channel in corresponding or like stages. This arrangement permits the output transformer secondaries to be connected in parallel and in-phase for monaural signal reproduction while effecting push-pull operation of the amplifiers.

Tracing the signal voltages in the two channels for push-pull operation, as the signal voltage in channel 5, at the grid 108 of the driver stage tube 66, increases in a positive direction, the voltage at the grid 77 of the output amplifier stage 75 increases in a negative direction, and the voltage at the terminal 95 of the primary winding 90 then increases in a positive direction to provide a negative voltage at the secondary terminal 101 which is applied back through the feedback circuit 105 and the grid resistor 106 to the grid 108, out-of-phase with the applied voltage for effective negative feedback.

At the same time the signal voltage on the grid 73 of the driver stage 67 in the other channel 6 increases in a negative direction, thereby causing the grid 77 of the output tube 76 to increase in a positive direction, and the voltage at the terminal 96 of the primary winding 115 to increase in a negative direction. Because of the reversal of the winding connection, the voltage at the terminal 101 of the secondary 116 increases in a negative direction, in in-phase relation to the voltage at the terminal 101 of the secondary winding 98. This voltage is applied through the feedback circuit 122 and the cathode resistor 121 to the cathode 120 of the driver stage tube 167 in phase with the grid voltage, as is proper for negative feedback. For stereophonic signal amplification with the secondaries disconnected one from the other, the feedback operation is the same.

By reason of the feedback in both channels, and particularly for stereophonic signal amplification when the two amplifiers are operated single-ended, ripple voltages from the plate supply circuit 88 are effectively eliminated without the addition of costly filtering means. In a circuit as shown, hum reproduction from ripple voltages has been reduced approximately 15db.

In a dual-channel amplifier, the feedback loops are located preferably following the volume and tone control circuits, as shown, and include the driver and output stages for each of the single-ended output amplifier channels. The grid circuit of the driver stage tube 66 in channel 5 is connected to ground through the grid resistor and a fixed portion of the secondary winding 98 between the terminal 101 and the ground terminal 102. The cathode circuit for the driver stage tube 67 in channel 6 is connected to ground through the cathode bias resistor 121 and a corresponding fixed portion of the secondary winding 116 between the terminal 101 and the ground terminal 102. Thus a fixed portion of the secondary winding in one channel is inserted serially in the grid circuit of the driver stage thereof, while a similar fixed portion of the secondary winding in the other channel is inserted serially in the cathode circuit of the driver stage of that channel, thereby providing grid injection of feedback voltage in the one channel and cathode injection of feedback voltage in the other channel at like amplifier stages from like feedback voltage sources, and from effectively a common feedback voltage source when the channels are interconnected at the secondary ends. The feedback circuit arrangement is thus independent of the mode of operation of the two channels. This type of operation could not be obtained if the feedback circuits were identical, as for stereophonic signal reproduction alone.

The voice coil terminals 125 and 126 of the speaker 9 are connected through a pair of supply leads 127 to a terminal block 128, or other suitable connection means, having terminals 129 and 130 connected respectively with the intermediate terminal 101 and ground 18, for receiving output signals from the secondary winding 98 at the terminals 101 and 102 at a nominal impedance to match the impedance of the speaker 9, that is, the voice coil 132. The latter is connected between the terminals 125 and 126 in a predetermined polarity relation thereto, marked for reference as plus and minus, as indicated. The secondary or output winding 98 between the intermediate terminal 101 and the ground terminal 102 may be assumed by way of example to match the impedance of the voice coil 132 at a nominal impedance of 4 ohms, and between the end terminal 100 and the ground terminal 102, the winding 98 may then be assumed to have a nominal impedance of 8 ohms.

The winding 98 is provided with a protective shunt load resistor 135 to prevent amplifier oscillation if the loud speaker load is removed, and is connected for this purpose between the terminals 101 and 102 through ground, as indicated. This may have an impedance in the present example of substantially 47 ohms. A similar protective load resistor 136 is provided for the secondary winding 116 and is similarly connected between the terminals 101 and 102 through ground 18 and may be of the same resistance value.

In the amplifier channel 6, the output speaker means, represented by the speaker 10, is provided with a voice coil 140 poled with respect to its terminals 125 and 126 the same as the voice coil 132 for the speaker 9 and is similarly polarity marked. This speaker is connected to ground 18 at the terminal 126 through a lead 142 and thence to the ground terminal 102 of the secondary winding 116. The terminal 125 is connected through a lead 143 to one contact 145 of a triple-pole double-throw switch 146, and through a movable contact element 147 therein, to a second contact 148 which in turn is connected through a lead 149 with the output or secondary terminal 101, thereby connecting the speaker 10 across the secondary winding 116 between the terminals 101 and 102, similarly poled and in the same manner as the speaker 9 is connected between the corresponding terminals of the secondary 98. Therefore, for in-phase signals in the secondary windings 98 and 116, the speakers 9 and 10 operate in proper in-phase relation. As shown and as connected, and thus far described, the two channels and the respective speaker means are independent and provide for normal functioning as two single-ended stereophonic amplifiers for stereophonic signal reproduction.

For this reason the two channels 5 and 6 may be considered to represent the left and right hand channels of the stereophonic amplifier system, and the speakers 9 and 10 may be considered to be spaced to the left and right, respectively, in front of a listener, and are so labelled in the drawing, for further reference. However, being equal, the channel designations could be reversed, with the understanding that the speakers 9 and 10 would be reversed in their placement with respect to a listener for stereophonic sound reproduction.

Since the speakers must be spaced preferably several feet apart for effective stereophonic sound reproduction, only one speaker or speaker system, represented in the present example by the speaker 10, is generally included with and as part of the radio, television, tape or phonograph-record playing equipment with which it is used. The other channel speaker or speaker system, represented by the speaker 9 in the present example, is housed separately for placement in proper spaced relation to the first speaker, and where stereophonic reproduction is not required initially, may, in the interests of economy, be omitted.

The speaker or speaker system included with the equipment, such as the speaker 10 may, therefore, be connected therewith by direct circuit connections permanently, whereas the external speaker or speaker system, such as the speaker 9, may be connected detachably to the equipment as indicated by the speaker supply leads 127 and their connection with the terminals 129—130 of the terminal block 128.

For monaural signal reproduction, as hereinbefore referred to, the two signal channels of the amplifier system, in accordance with the invention, operate in push-pull or out-of-phase relation but with the speaker output circuits or output transformer secondary windings connected for operation in parallel and in-phase relation. With the low potential terminals 102 of the output transformer secondary windings or output circuits connected together through ground and to the like polarity terminals of the two speakers, the secondary or output circuits may then be connected in parallel for in-phase operation by a simple switching connection provided between the intermediate terminals 101 or between the end terminals 100 of the two secondary windings. In accordance with the invention, either or both connections may be provided. As shown in the present example, both are provided and for different purposes, depending upon whether the amplifier system is to be used exclusively for monaural signal reproduction or for both monaural and stereophonic signal reproduction. The exclusive monaural operation would be for the purpose of economy, and would include the reproduction of stereophonic signals monaurally, utilizing only the lateral signal components for example, as in the reproduction of stereophonic sound records monaurally and through one speaker or speaker system, as well as in the reproduction of purely monaural signals.

Where economy of operation is desired through the use of the one speaker or speaker system provided with the equipment, impedance matching, as hereinbefore mentioned, is provided by the higher impedance connection terminals 100 on each secondary winding, which have effectively double the impedance provided at the normal output terminals 101, with respect to the ground or common terminals 102. Otherwise a speaker of a lower nominal impedance of 2 ohms, for example, would have to be substituted, and this would present an undesirable service problem with such equipment.

In the present example, therefore, for monaural signal reproduction through one speaker, no left channel speaker is provided and hence may be assumed to be disconnected at the terminals 129—130, leaving only the main speaker 10 for use with the equipment. This is then disconnected from the terminal 101 and connected to the 8-ohm terminal 100 of the secondary 116. This change is made by operation of the triple-pole double-throw switch 146 to move the contact element 147 in engagement with the contact 145 from the fixed contact 148 into engagement with a fixed contact 152 which is connected through a lead 153 to a fixed contact 154 of the switch and thence to the terminal 100. A second movable contact element 156 is connected with but insulated from the movable contact 147 to move simultaneously therewith and connect the fixed contact 154 with a fixed contact 157 which, in turn, is connected through a lead 158 with the end terminal 100 of the output transformer secondary 98 for the other signal channel.

By this improved and simplified speaker switching circuit, the terminals 100 are connected to provide parallel in-phase operation of the two secondary windings and at the same time provide proper impedance matching with the single speaker 10 for effective monaural signal amplification as hereinbefore described, with one speaker outlet for both channels. The speaker switching circuit further provides that when the second speaker or speaker system, such as the speaker 9, is available, each signal channel may then be connected with its own individual speaker outlet, whether used for monaural signal amplification alone or for both monaural and stereophonic signal amplification. In this case, the switch 146 is maintained with its movable contact elements in the position shown in the drawing to provide the speaker connection with the lower impedance terminals 101 and 102 of the output secondary winding 116 for channel 6. The speaker 9 is connected, as shown, through the terminal block 128 across the lower impedance terminals 101 and 102 of the output transformer secondary winding 98 for channel 5. With the switch 146 in the normal position shown, the parallel connection through the lead 158 between the secondary windings 98 and 116 is open.

Since the two speakers are connected for operation with their individual signal channel amplifiers in this mode of operation the two secondary windings may be connected in parallel for monaural signal amplification through simple two-point switch means connected between the terminals 101 of the two secondary windings, and operated to open and close the connection as required for the different functions of the equipment. In the present example, the switch 159 is for this purpose and is of the rotary multiple-position selector type having a movable contact 160 connected through a lead 161 with the terminal 101 of the secondary 116, and having five fixed contacts 162–166, alternate ones of which, 162, 164 and 166, are connected through a lead 168 with the terminal 101 of the secondary 98. The contacts 163 and 165 are blank to provide an open circuit condition for full stereophonic operation of the two channels with the amplifiers operating independently for those positions of the movable contact 160, as will hereinafter appear, while in the position shown and for corresponding other contacts 164 and 166, the switch is closed to connect the two output circuits in parallel for monaural signal amplification through the two channels as hereinbefore described, but with both speakers in operation.

From the foregoing description it will be seen that the signal channels may provide monaural signal amplification with either one speaker or both speakers, and in either case the secondary or output circuits are connected for parallel in-phase operation by closing single-point switch means connected between corresponding terminals or points or substantially equal voltage on the output secondary windings.

If a single speaker is used in place of the two speakers, it has been pointed out that for proper impedance matching, its nominal impedance should be half that of either of the two speakers normally provided, and that since one of the speakers, such as the speaker 10 in the present example, is incorporated in the equipment as a part thereof, it would not be practical to change the speaker to one having half the nominal impedance. Therefore, both secondary windings are provided with the higher impedance tap points or terminals 100 for matching the single equipment speaker when connected in parallel. The simple switching circuit, provided in connection with the switch 146, simultaneously connects the single speaker to both high impedance tap points or terminals 100 and provides the parallel connection between the two channels as required in accordance with the invention for monaural push-pull operation of the dual-channel amplifier system.

The switch 159, however, opens and closes the parallel connection between the two channels at the low impedance terminals 101, effectively as a two-point switch. In the present example, it is a multiple-position switch for operation with and as part of function selector switch means for the amplifier system which includes two other multiple-position selector switches 170 and 171, having movable contacts 173 and 174 respectively, connected with the respective input circuits 11 and 12 for the two signal channels. The movable contacts 173 and 174 are mechanically connected with the movable contact 160 of the switch 159 for unitary or gang operation therewith, as indicated by the dotted lines 176 and 177, and have the same number of operation positions as the contact 160. A greater or lesser number of positions may be provided, depending upon the number of functions for which the amplifier system is to be used in any case.

In the present example, the selector switch means is arranged to provide for five operating functions of the amplifier system in a radio-phonograph combination. Starting with the position shown and reading in a clockwise direction therefrom: Position 1 provides for phonograph signal reproduction monaurally in connection with a stereophonic phonograph pickup 180 or other source of stereophonic or "push-pull" signals; position 2 provides for phonograph signal reproduction stereophonically from the same source; position 3 provides for monaural sound signal reproduction from any single-ended monaural sound signal source such as a radio or television receiver 182; and positions 4 and 5 provide tape sound-signal reproduction respectively, stereophonically and monaurally. These switch positions are designated in a combination instrument for use in the home entertainment field, for example, as (1) Phono Single, (2) Phono Stereo, (3) Tuner, (4) Tape Stereo and (5) Tape Single. This arrangement of functions is typical of equipment to which the invention is particularly adapted.

In the present selector switch means the selector switch 170 operates to connect the input circuit 11—18 and the left-channel amplifier 5 selectively to the three signal sources indicated, while the selector switch 171 operates to connect the input circuit 12—18 and the right-channel amplifier 6 to the same signal sources. The first and second contacts 182 of the selector switch 170 are connected through an input lead 183 and an input terminal board 184 with a shielded output conductor 186 for a left channel pickup element 188 of the pickup 180. In a similar manner the first and second contacts 190 of the selector switch 171 are connected through an input lead 191 and the terminal board 184 with a second shielded output conductor 192 for a right-channel pickup element 194 of the pickup 180. The two pickup elements 188 and 194 are connected to a common stylus element 196 for joint operation when playing a phonograph record 197 of the stereophonic or monaural type on a suitable turntable 198. The common connection of the two pickup elements 188 and 194 with the stylus element 196 is also provided with a common electrical output connection with the amplifier channels through a lead 199 and a grounded shield conductor 200 surrounding the output conductors 186 and 192. At the amplifier terminal board 184 the shield conductor 200 is connected with a terminal 201 having a ground connection 18, which is common to both amplifier channels, as hereinbefore described. Each of the input leads between the terminal board 184 and the switch contacts 182 and 190, includes a series filter resistor 203 and a shunt filter capacitor 204 for correcting the frequency response of the pickup elements 188 and 194.

With the selector switch means in the first position or the second positions it will be seen that the input circuit 11—18 is connected with the left channel pickup element 188, while the input circuit 12—18 is connected with the right channel pickup element 194, whereby sound signals picked up from the record are translated by the pickup and applied to the two channels of the amplifier. However, when the selector switch means is in the first position, the selector switch 159 is closed to tie the channel output ends in parallel, thereby to effect cancellation of the vertical signal response from the pickup 180, as hereinbefore described. In the second position of the selector switch means, the selector switch 159 is open to permit the two amplifier channels to operate independently for full stereophonic response from the pickup 180.

The pickup 180 may be of any commercially available type for stereophonic sound reproduction, such as a dual crystal or ceramic type, wherein the elements 188 and 194 are arranged at substantially 45 degrees with respect to the vertical axis of the single stylus element 196 which is provided with both vertical and lateral compliance to respond to right and left-hand recordings in a single groove of the record being played for stereophonic reproduction. The pickup output circuit is such that for the lateral signal components of a stereophonic recording, the two signal generating pickup elements 188 and 194 operate in push-pull relation to provide push-pull or out-of-phase signals, at the two output leads 186 and 192, which are applied directly to the input grid circuits 11 and 12. The vertical signal components of a stereophonic recording provide output signals from the two pickup elements 188 and 194 which are in phase at the two output leads 186 and 192, and when both channels 5 and 6 are operated independently, as for stereophonic sound reproduction, both signal components are amplified and reproduced through the two speaker systems. When the two channels are connected at the output circuits, as when the selector switch 159 is closed as shown, monaural record reproduction is possible, both from either stereophonic and monaural records, with the vertical signal components, which include rumble, noise and distortion, cancelling in the parallel connected output circuits for the two channels.

The signal receiver 182, representing any single-ended or monaural signal source, is provided with an audio frequency or modulation signal output circuit comprising a conductor 210 and a shield conductor therefor 211. The conductor 210 is connected through an input terminal board 212 and an input lead 213 with a third contact 214 on the selector switch 170 for the left channel input circuit 11—18. The shield conductor 211 is connected to a grounded terminal 215 on the terminal board thereby completing the input circuit from the signal receiver directly to the left channel amplifier 5 when the switch contact 173 is moved to the contact 214. In this position the contact 174 for the input circuit 12—18 of the right channel amplifier 6 is connected to a corresponding third contact 216, which is connected through an input lead 217 and the terminal board 212 with the shielded signal conductor 210 through a phase inverter 220. As referred to hereinbefore, this may be of any suitable type, such as a single-stage zero-gain transistor or electronic tube amplifier. The ground connection for the phase inverter is provided with the terminal 215 as indicated and with the shield conductor 211 thereby completing the signal receiver modulation or audio frequency output circuit to the right channel amplifier input circuit 12—18 through the phase inverter.

The monaural signal output from the signal receiver is thus applied to the two signal amplifying channels 5 and 6 in push-pull or out-of-phase relation, and due to the reversal of the primary winding 115 in the channel 6, the two resultant out-of-phase signals are in-phase in the secondary output circuits, as hereinbefore described. The selector switch 159 is closed to the contact 164, thereby placing the channel output circuits in parallel for monaural signal operation.

The tape input connection for the amplifier system is similar to that provided for the stereophonic pickup and comprises a terminal board 222 having a grounded terminal 223, an input terminal 224 connected through an input lead 225 with switch contacts 226 for the fourth and fifth switch positions of the selector switch 170. In a similar manner, the corresponding switch contacts 228 of the selector switch 171 are connected through an input lead 227 with a third input terminal 228 at the terminal board 222.

When the switch contacts 173 and 174 are moved to the fourth and fifth positions for connection with the tape input terminals of the amplifier system, the selector switch 159 is operated to move the contact 160 into engagement with the contacts 165 and 166 for the fourth and fifth positions respectively. Therefore, for the fourth position, with the contact 160 connected with the contact 165, the two amplifier channels operate independently for stereophonic signal reproduction through the tape input terminals. When the selector switch means is moved to the fifth position, the switch contact 160 is moved into engagement with the contact 166, thereby connecting the two channels in parallel at the output circuits and providing for the push-pull or out-of-phase monaural operation of the amplifier system in which the in-phase signals in the two channels are cancelled in the output circuits, as for other monaural signal amplification, as hereinbefore described.

From the foregoing description it will be seen that the two amplifiers provide two normally separate signal channels for stereophonic signal amplification, which are connected for push-pull or out-of-phase operation for monaural signal amplification, and in each case with effective negative feedback in each channel. In order that the output signals from the two amplifiers or channels may be in phase at the loud speakers or output circuits, with the operational advantages herein described, signal phase inversion is made in the one channel at the output end thereof, as by reversal of the primary terminal connections for the output transformer. As described, when the secondaries or output circuits are connected in parallel, even-order harmonic distortion and out-of-phase signal components are substantially cancelled, as well as undesired vertical signal response from monaural or stereophonic pickups. The change from monaural to stereophonic operation may be affected by simple switching means for opening and closing a connection between the two output or secondary circuits, and without change in the dual feedback circuits which remain connected between fixed points on each amplifier channel.

It will be seen, therefore, that an improved, low cost dual-channel audio-frequency amplifier system, with effective feedback, for stereophonic or monaural signal amplification may be provided in accordance with the invention. In such dual-channel audio-frequency signal amplifying systems, dual feedback circuits permit two separate single-ended amplifying channels to be used for stereophonic signal amplification with minimum power supply filtering and to be connected together in phase at the output circuits for monaural signal amplification effecting push-pull or out-of-phase operation of both channels with even-order harmonic distortion reduction and the same power output as for stereophonic signal reproduction.

What is claimed is:

1. A dual-channel audio-frequency signal amplifier system comprising, a pair of like single-ended multistage amplifiers, speaker output means for each amplifier, said amplifiers having circuit connections providing dual-channel monaural and stereophonic signal amplification and in-phase signal output therefrom to said speaker means, a negative feedback circuit connected with one amplifier for feeding back signal output therefrom in out-of-phase relation to the signal applied to one stage of said amplifier, a second negative feedback circuit connected with the other amplifier for feeding back signal output therefrom in in-phase relation to the signal applied to a corresponding stage of said other amplifier, and means for connecting said speaker means and feedback circuits in parallel for monaural signal reproduction.

2. A dual-channel stereophonic signal amplifier system comprising in combination, a pair of like single-ended multistage amplifiers providing two individual signal amplifier channels, an electronic-tube amplifier stage in each channel having input grid and cathode circuits, individual output speaker means for each channel connected for in-phase response to push-pull or out-of-phase signals in the amplifier channels, means providing a feedback circuit in each channel connected with the cathode circuit in one channel and with the grid circuit in the other channel for feeding back a portion of said signal output from each channel individually for effective negative feedback and hum reduction in both channels, and means providing a connection between said amplifier channels for in-phase signal output to said speaker means in parallel and negative feedback in each channel from a common source.

3. A dual-channel stereophonic signal amplifier system comprising in combination, a pair of like single-ended multistage amplifiers providing parallel signal channels connected by phase inversion in one channel for push-pull or out-of-phase dual-channel operation from monaural signals and out-of-phase components of stereophonic signals from a single source, means providing a speaker output circuit for each signal channel, means providing a negative feedback circuit for each amplifier channel connected in like polarity to the respective output circuits and to like stages for feedback injection in said one channel which is out-of-phase with respect to the signal applied to that channel and feedback injection in the other channel which is in-phase with respect to the signals applied to said other channel, and means providing a parallel connection between said output circuits for in-phase operation thereof and feedback in common to both feedback circuits.

4. A dual-channel stereophonic signal amplifier system comprising in combination, a pair of like single-ended multistage amplifiers providing dual amplifier channels for said system, an intermediate amplifier stage in each of said channels, a signal output transformer for each of said amplifiers, said transformers having like primary and like secondary windings and terminals, means providing a negative feedback circuit connection in one channel between the secondary winding and the intermediate amplifier stage thereof for feedback injection of signals that are in-phase with respect to the signals that are applied to said stage, means providing a second negative feedback circuit connection in the other channel between the secondary winding and the intermediate amplifier stage thereof for feedback injection of signals that are out-of-phase with respect to the signals that are applied to said stage, and means for connecting the secondary windings in parallel relation for in-phase operation as a common source of negative feedback signals to both channels.

References Cited in the file of this patent

UNITED STATES PATENTS

| | | |
|---|---|---|
| 2,785,226 | Cook | Mar. 12, 1957 |
| 2,906,831 | MacDonald | Sept. 29, 1959 |